(12) United States Patent
Bauchot et al.

(10) Patent No.: US 8,019,858 B2
(45) Date of Patent: Sep. 13, 2011

(54) SYSTEM AND METHOD FOR UTILIZING SYSTEM LAG TO SEND FACTS TO AN END USER

(75) Inventors: Frederic Bauchot, Saint-Jeannet (FR); Flemming Boegelund, Frederikssund (DK); Robert George Farrell, Cornwall, NY (US); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/234,789

(22) Filed: Sep. 22, 2008

(65) Prior Publication Data

US 2010/0070622 A1    Mar. 18, 2010

(51) Int. Cl.
*G06F 15/173* (2006.01)
(52) U.S. Cl. ......................................... 709/224; 709/232
(58) Field of Classification Search .................. 709/224, 709/233, 206, 207, 229, 232; 707/3; 345/440
See application file for complete search history.

(56) References Cited

U.S. PATENT DOCUMENTS

| | | | |
|---|---|---|---|
| 5,996,007 A | 11/1999 | Klug et al. | |
| 6,243,105 B1 * | 6/2001 | Hoyer et al. | 345/440 |
| 6,442,529 B1 | 8/2002 | Krishan et al. | |
| 6,615,251 B1 | 9/2003 | Klug et al. | |
| 6,813,768 B1 | 11/2004 | Cragun | |
| 7,069,304 B1 * | 6/2006 | Eichstaedt et al. | 709/207 |
| 7,836,191 B2 * | 11/2010 | Susai et al. | 709/229 |
| 2002/0198985 A1 * | 12/2002 | Fraenkel et al. | 709/224 |
| 2003/0236878 A1 * | 12/2003 | Egi | 709/224 |
| 2005/0076024 A1 * | 4/2005 | Takatsuka et al. | 707/3 |
| 2006/0271700 A1 * | 11/2006 | Kawai et al. | 709/233 |
| 2007/0079002 A1 * | 4/2007 | Nakaike et al. | 709/233 |
| 2007/0214261 A1 * | 9/2007 | Kikuchi et al. | 709/224 |
| 2010/0017484 A1 * | 1/2010 | Accapadi et al. | 709/206 |

* cited by examiner

*Primary Examiner* — Jungwon Chang
(74) *Attorney, Agent, or Firm* — Schmeiser, Olsen & Watts; John Pivnichny

(57) ABSTRACT

A method for utilizing system lag to send facts to an end user. The method begins by monitoring a computer system to identify said system lag. After identifying system lag, the method determines an estimated length of the system lag, the estimated length being a measurement of time. The estimated length takes into account previously identified system lag lengths to better approximate the current system lag length. After determining the estimated length of the system lag, the method sends a fact to the end user during the system lag. The fact sent to the end user has a length equal to or less than the estimated length of the system lag. Finally, the method stores the actual length of the system lag in order to improve subsequent determinations of the estimated length.

25 Claims, 2 Drawing Sheets

SYSTEM AND METHOD FOR UTILIZING SYSTEM LAG TO SEND FACTS TO AN END USER

BACKGROUND OF THE INVENTION

The present invention relates generally to providing facts to an end user, and more particularly to providing facts to an end user during moments where the user waits for a computer system to respond to a command.

SUMMARY OF THE INVENTION

The present invention provides a method for utilizing system lag to send facts to an end user, said method comprising: monitoring a computer system to identify said system lag; in response to having identified said system lag, determining an estimated length of said system lag, said estimated length being a measurement of time; sending a fact to said end user during said system lag, said fact having a length equal to or less than said estimated length; and storing the actual length of said system lag in order to improve subsequent determinations of said estimated length.

DETAILED DESCRIPTION OF THE DRAWINGS

Definitions

The term "lag" as used in the specification and subsequently in the claims means the amount of time which elapses between the last command received by a computer system and the time at which the computer system returns a response to the last command.

The term "repository" as used in the specification and subsequently in the claims means a storage location which may be formatted in a multitude of different ways (e.g. relational database, XML file, CSV file, spreadsheet, flat file, etc.).

The terms "advertisement", "promotional information", "product information" and "public service message" as used in the specification and subsequently in the claims means a notice in the print, broadcast, or electronic media, designed to attract public attention or patronage towards a good and/or service.

Specification

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
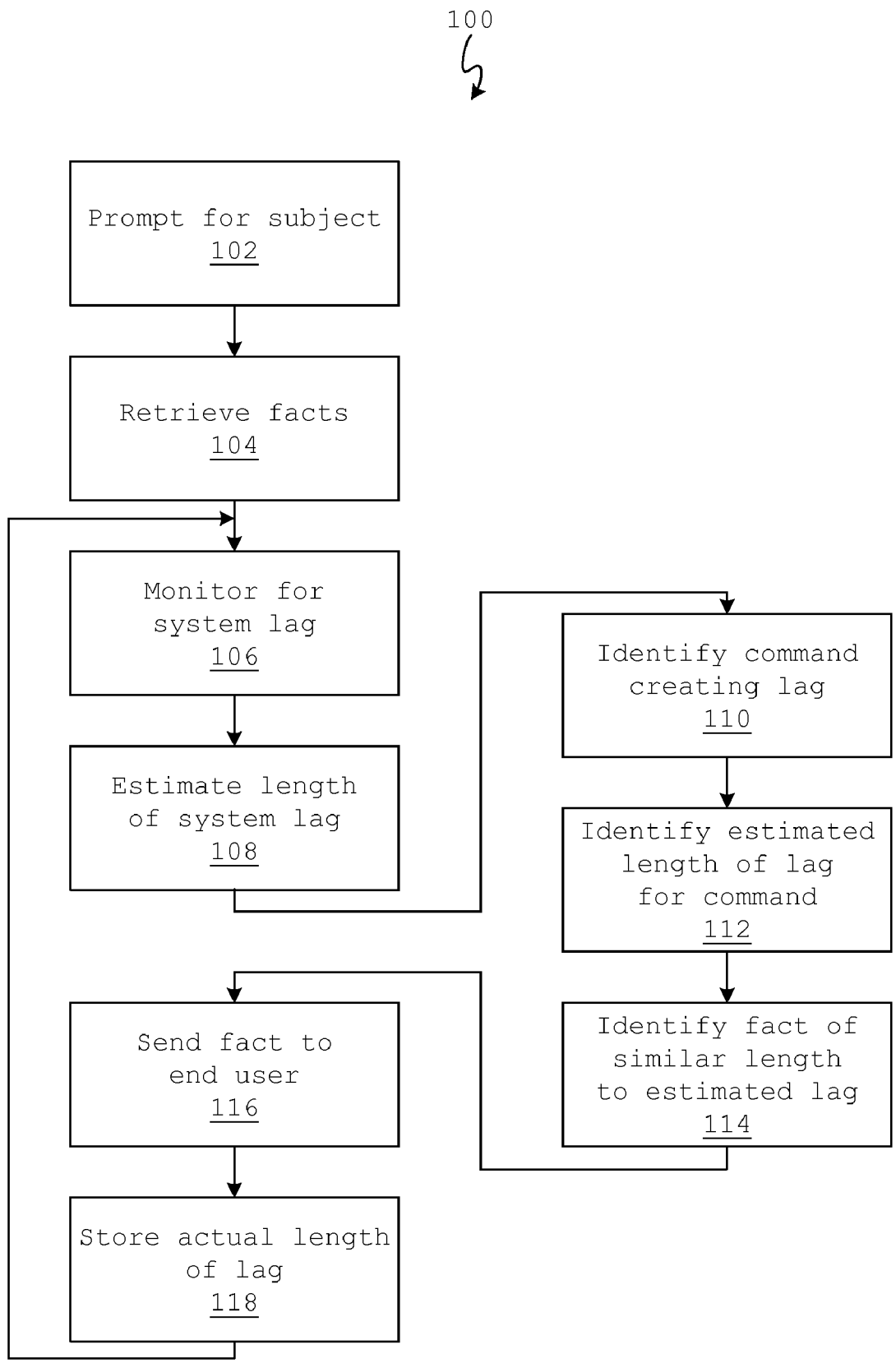
FIG. 1 illustrates a method for utilizing system lag to send facts to an end user, in accordance with embodiments of the present invention.

FIG. 1 illustrates a method 100 for utilizing system lag to send facts to an end user, in accordance with embodiments of the present invention. The method 100 begins with step 102 which prompts the end user for at least one subject.

Step 102 prompts the end user for at least one subject. In one embodiment of the present invention, the prompt comprises a question (e.g. "What would you like to learn more about?") to which the end user responds identifying at least one subject (e.g. the Milky Way, Albert Einstein, Dinosaurs, etc.) in which the end user would like to learn about.

In another embodiment of the present invention, the prompt comprises a list of subjects that the method 100 offers. The end user then selects, via checkmark or some other identifying means, at least one subject contained in said prompt which the end user wishes to learn about.

Completion of step 102 occurs upon receipt from the end user of an identification of at least one subject to which the end user wishes to learn about. After completion of step 102, the method continues with step 104 which retrieves the facts associated with the selected subject(s).

Step 104 retrieves facts correlating to each subject selected by the end user in step 102. Step 104 retrieves multiple facts for each subject selected by the end user. The facts for a given subject comprise different lengths, length being a measurement of the time necessary for a typical end user to process the fact. It is understood that multiple facts for a single subject may comprise the same length. Collectively, the facts as a whole for a single subject comprise different lengths in an effort to use system lags of different lengths to provide a fact to the end user.

It is also understood that the facts retrieved by the present invention are not advertisements, promotional information, product information, or public service messages. In the spirit of the present invention the facts do not direct the end user towards a good and/or service, but instead provide information about a subject to which the end user previously specified.

For example, a fact of short length regarding the Milky Way may be "The Milky Way looks brightest in the direction of the constellation of Sagittarius, toward the galactic center", where a fact of a long length may be "The stellar disk of the Milky Way galaxy is approximately 100,000 light years in diameter, and is believed to be, on average, about 1,000 light years thick." The varying lengths of the facts for a given subject are necessary to better utilize the system lag to provide an appropriate fact to the end user.

Step 104 retrieves facts for each subject from repositories. In one embodiment of the present invention, the repositories reside on a server accessible via a network connection. In another embodiment of the present invention, the repositories reside in storage device connected to the computer system to which step 104 retrieves the facts. After retrieving the facts, step 104 is completed and the method 100 continues with step 106 which monitors the computer system for lag.

Step 106 monitors the computer system for lag. System lag may be the time a processor requires to calculate a value. System lag may be the time it takes the computer system to request information and receive said information from a remote network. Moreover, system lag may be monitored by different methods. On method for monitoring and detecting system lag is for step 106 to monitor the computer ports on the computer system. The computer ports provide a physical interface between the computer system and peripheral devices. By monitoring the computer ports, step 106 can detect a request made to a peripheral device and the lag associated therein.

For example, step 106 can monitor port 110 on the computer system, port 110 is conventionally used for POP3 mail transfer. When step 106 detects a request sent via port 110, it can be inferred from the nature of email requests that the computer system will incur system lag between submitting the request for email and receiving the requested email.

Another method for detecting system lag is for step 106 to monitor the output devices 910 (see FIG. 2, infra) connected to the computer system. For example, step 106 may monitor a hard disc drive (HDD) for activity. If step 106 detects data being written to and/or read from the HDD, it can infer that the computer system is experiencing system lag due to sending or retrieving data from the HDD.

It is also known by those possessing skill in the art that the monitoring performed by step 106 may include, inter alia, monitoring a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), a cache, a dynamic random access memory (DRAM), a read-only memory (ROM), a hard disk, a floppy disk, a magnetic tape, an optical storage such as a compact disc (CD) or a digital video disc (DVD), etc.

After completion of step 106 where system lag is detected, the method 100 continues with step 108 which estimates the length of the current system lag.

Step 108 estimates the length of the current system lag, the estimation beginning with step 110 wherein the method 100 identifies the command responsible for the current system lag.

Step 110 identifies the command responsible for the current system lag. In one embodiment of the present invention, the method 100 monitors all commands received from the end user, third party, other computer, etc. After identifying a system lag pursuant to step 106, step 110 readily reviews the last known command received thus identifying the command responsible for the lag. After identifying the command responsible for the current lag, step 110 completes and the method 100 continues with step 112 which identifies and/or determines the estimated length of the current system lag.

Step 112 identifies and/or determines the estimated length of the current system lag. Step 112 maintains a repository of all commands identified as having previously caused a system lag. The repository further comprises a length, measured in units of time (e.g. seconds, millisecond, microsecond, etc.) for each previously identified command causing a system lag. The estimated length of system lag for each identified command may be, inter alia, the mean, median, or mode length of system lag for the given command. Therefore it is understood that the present invention utilizes previously identified and utilized system lags to better approximate future system lags, therein better utilizing future system lags to provide an end user with a fact on a selected subject.

Step 112 receives the identified command, looks up the identified command in the repository, and identifies the corresponding length of the system lag for the identified command.

In one embodiment of the present invention, if the identified command is absent from the repository, step 112 creates a new entry in the repository (the identified command) and assigns the corresponding estimated length of lag as zero (0).

In an alternative embodiment of the present invention, if the identified command is absent from the repository, step 112 creates a new entry in the repository (the identified command) and assigns the corresponding estimated length of lag equal to the length of lag for a similar command. For example, if step 112 determines that the identified command "login to email" does not reside within the repository, step 112 creates a new repository entry for "login to email". Step 112 would then determine a similar command already residing in the repository, perhaps "login to credit card webpage". If "login to credit card webpage" correlates to an estimated system lag of 2.51 seconds, step 112 will assign "login to email" an estimated system lag time of 2.51 seconds.

After completion of step 112, the method 100 continues with step 114 which identifies a fact having a similar length to the estimated lag, said estimated lag being identified in step 112.

Step 114 identifies a fact having a length not exceeding the estimated lag (e.g. about the same length or a smaller length), said estimated lag being previously identified in step 112. Prior to step 114 and preferably before step 106, a collection of various facts spanning the different subjects selected in response to step 102 are stored in the computer system cache and/or memory (RAM). The collection of facts should also contain facts of different lengths to accommodate system lags of different lengths. Step 114 receives the estimated system lag time from step 112 and identifies a fact residing in cache and/or memory of the same or smaller length.

For example, if the estimated system lag identified for the command "login to email" is 2.51 seconds, step 114 would search the facts residing in the cache and/or memory for a fact of the same or smaller 2.51 second length. After identifying a fact equal or lesser length to the estimated lag, step 114 completes and the method 100 continues with step 116 which sends the identified fact to the end user.

Step 116 sends the identified fact to the end user. In one embodiment of the present invention, the fact is displayed through a graphical user interface on an output device 910 (see FIG. 2, infra), primarily a monitor and/or liquid crystal display. In an alternative embodiment of the present invention, the fact may be of an audio nature and sent to an output device 910 such as a set of speakers connected to the computer system.

The fact will be displayed in such a manner so as to differentiate said fact from any program, application, operating system, or service the end user is currently utilizing on the computer system. For example, the fact may be displayed on a computer monitor with characteristics different from running applications, such as different font, font color, font style, location, etc. Similarly if the fact audio in nature, the present invention may mute current audio sounds emanating from the computer in order to provide the audio fact to the end user.

It is understood that in an alternative embodiment of the present invention, a given fact may be sent to the end user multiple times to increase the end user's semantic declarative knowledge. Declarative knowledge is factual information stored in one's memory and known to be static in nature. Semantic knowledge is the memory of words, facts, meanings of words, etc. The present invention increases an end user's semantic declarative knowledge by repeatedly sending facts to the end user, which is also known as repetition priming.

Repetition priming refers to the theory that an initial presentation of a stimulus influences the way in which an end user will respond to that stimulus when it is presented at a later time. By repeatedly sending a given fact to the end user, the present invention encourages the end user to retain the given fact as semantic declarative knowledge.

In an alternative embodiment of the present invention, a given fact may be repeatedly sent to the end user a predetermined number of times. The predetermined number, also known as a threshold, may be established by the end user during the subject selection process (see step 102, supra). Once the number of times a given fact is sent to the end user exceeds the threshold, the fact is no longer available during step 114 when the present invention identifies a fact having the same or shorter length than the estimated system lag.

After sending the fact to the end user, step 116 completes and the method 100 continues with step 118 which stores the actual length of the current system lag.

Step 118 stores the actual length of the current system lag. When step 118 detects the response to the command initiating the current system lag, step 118 calculates the actual length of the system lag. The actual length of the current system lag and therein incorporated into the repository managed by step 112.

In one embodiment of the present invention, the incorporation comprises averaging the estimated length of the lag residing in the repository with the actual system lag recorded by step 118. In an alternative embodiment of the present invention, the incorporation comprises determining the median length of the estimated lag for the command by utilizing the actual system lag captured by 118.

After completion of step 118, the method 100 returns to step 106 to monitor for future system lag. An alternative embodiment of the present invention, after step 118, the method 100 ends.

In an alternative embodiment of the present invention, the method 100 would begin with step 106 monitoring for the system lag. In this alternative embodiment, the subject and accompanying facts prompted for in step 102 and retrieved pursuant to step 104 are foregone provided the end user already supplied the requested subjects in a previous instance of the present invention.

For example, the end user previously identified 'Milky Way' as a subject in which they would like learn about. During the first instance of the present invention, facts regarding the Milky Way would be provided to the end user during system lag. When the first instance ends and the second instance begins, the present invention would continue providing facts regarding the Milky Way to the end user. Therefore, prompting the end user for identification of a subject which they would like to learn about is redundant and skipped.

Figure 2:
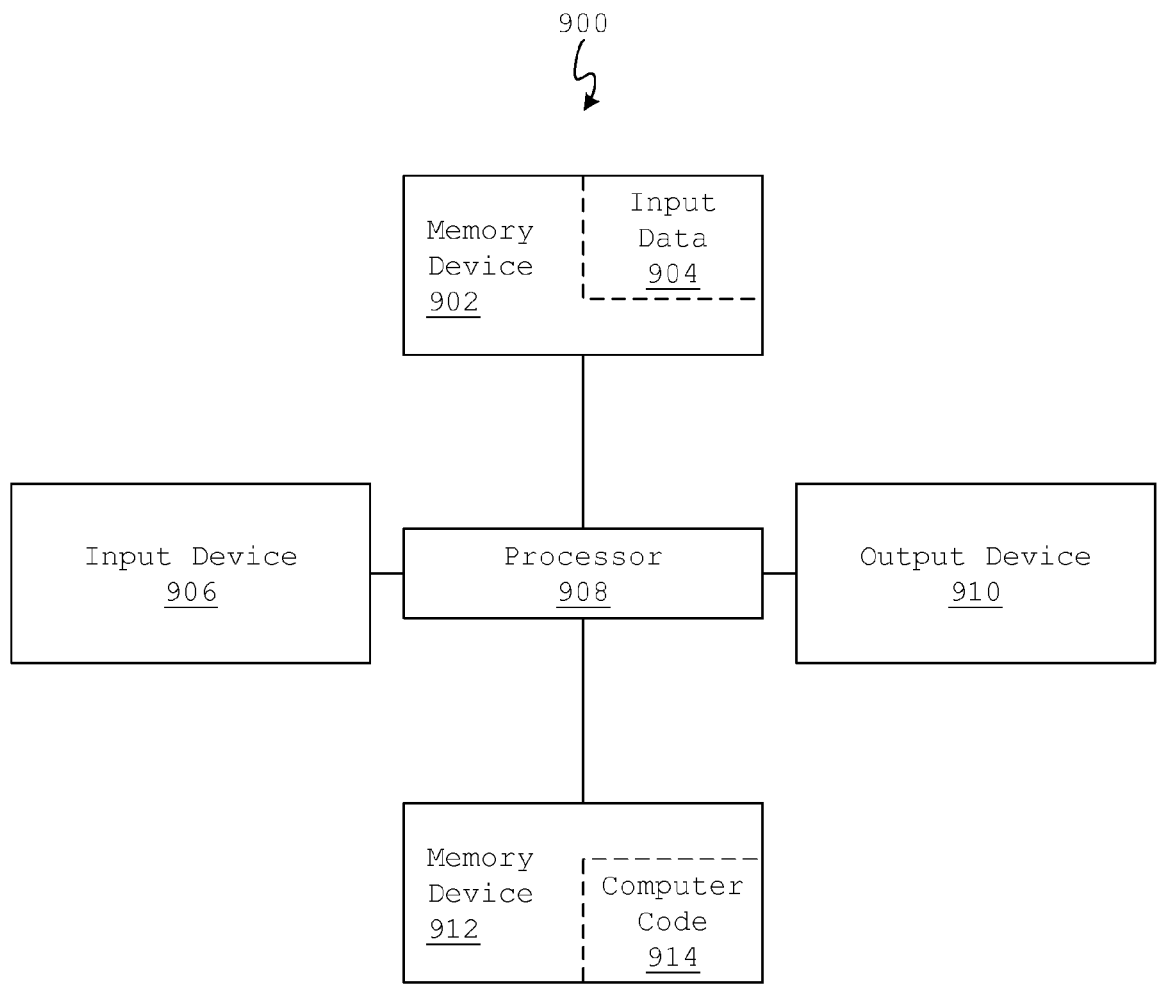
FIG. 2 illustrates a computer system which may facilitate a method for utilizing system lag to send facts to an end user, in accordance with embodiments of the present invention.

FIG. 2 illustrates a computer system 900 which may facilitate a method for utilizing system lag to send facts to an end user, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for utilizing system lag to send facts to an end user according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 2) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for utilizing system lag to send facts to an end user. Thus, the present invention discloses a process for supporting computer infrastructure, comprising integrating, hosting, maintaining and deploying computer-readable code into a computing system (e.g., computing system 900), wherein the code in combination with the computing system is capable of performing a method for utilizing system lag to send facts to an end user.

In another embodiment, the invention provides a business method that performs the process steps of the invention on a subscription, advertising and/or fee basis. That is, a service provider, such as a Solution Integrator, can offer to create, maintain, support, etc. a process for authenticating an end user. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 2 shows the computer system 900 as a particular configuration of hardware and software, any configuration of hardware and software, as would be known to a person of ordinary skill in the art, may be utilized for the purposes stated supra in conjunction with the particular computer system 900 of FIG. 2. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for utilizing system lag to send facts to an end user, said method comprising:
    monitoring a computer system to identify said system lag;
    in response to having identified said system lag, determining an estimated length of said system lag, said estimated length being a measurement of time;
    sending a fact to said end user during said system lag, said fact having a length equal to or less than said estimated length; and
    storing the actual length of said system lag in order to improve subsequent determinations of said estimated length.

2. The method of claim 1, where prior to said monitoring:
    receiving from said end user an identification of at least one subject which said end user wishes to learn about, said receiving being in response to prompting said end user for said at least one subject;

retrieving facts for each subject of said at least one subject, each fact of said facts having a length, said length being a measurement of time; and storing said facts for each subject of said at least one subject in a first repository.

3. The method of claim 1, where prior to said monitoring:

receiving from said end user an identification of at least one subject which said end user wishes to learn about, said at least one subject being a subset of a list of subjects, said receiving being in response to providing said end user with said list of subjects;

retrieving facts for each subject of said at least one subject, each fact of said facts having a length, said length being a measurement of time; and storing said facts for each subject of said at least one subject in a first repository.

4. The method of claim 1, said determining further comprising:

identifying a last command received by said computer system before having identified said system lag;

searching a second repository for said last command; and in response to having found said last command in said second repository, using a length in said second repository corresponding to said last command as said estimated length.

5. The method of claim 1, said determining further comprising:

identifying a last command received by said computer system before having identified said system lag;

searching a second repository for said last command; and in response to having not found said last command in said second repository, adding said last command to said second repository, adding a length of zero to said second repository, associating said length of zero to said last command, and using said length of zero as said estimated length.

6. The method of claim 1, said storing further comprising:

identifying a last command received by said computer system before having identified said system lag;

searching a second repository for said last command; and in response to having found said last command in said second repository, storing said actual length of said system lag in said second repository, deleting from said second repository a length corresponding to said last command, and associating in said second repository said actual length with said last command.

7. The method of claim 1, said storing further comprising:

identifying a last command received by said computer system before having identified said system lag;

searching a second repository for said last command; and in response to having found said last command in said second repository, storing a value in said second repository equal to an average between said actual length of said system lag and a length located in said second repository corresponding to said last command, and associating in said second repository said value with said last command.

8. A computer program product, comprising a computer readable storage device having a computer-readable program code stored therein, said computer-readable program code containing instructions that when executed by a processor of a computer system implement a method for utilizing system lag to send facts to an end user, said method comprising:

monitoring a computer system to identify said system lag;

in response to having identified said system lag, determining an estimated length of said system lag, said estimated length being a measurement of time;

sending a fact to said end user during said system lag, said fact having a length equal to or less than said estimated length; and storing the actual length of said system lag in order to improve subsequent determinations of said estimated length.

9. The computer program product of claim 8, where prior to said monitoring:

receiving from said end user an identification of at least one subject which said end user wishes to learn about, said receiving being in response to prompting said end user for said at least one subject;

retrieving facts for each subject of said at least one subject, each fact of said facts having a length, said length being a measurement of time; and storing said facts for each subject of said at least one subject in a first repository.

10. The computer program product of claim 8, where prior to said monitoring:

receiving from said end user an identification of at least one subject which said end user wishes to learn about, said at least one subject being a subset of a list of subjects, said receiving being in response to providing said end user with said list of subjects;

retrieving facts for each subject of said at least one subject, each fact of said facts having a length, said length being a measurement of time; and storing said facts for each subject of said at least one subject in a first repository.

11. The computer program product of claim 8, said determining further comprising:

identifying a last command received by said computer system before having identified said system lag;

searching a second repository for said last command; and in response to having found said last command in said second repository, using a length in said second repository corresponding to said last command as said estimated length.

12. The computer program product of claim 8, said determining further comprising:

identifying a last command received by said computer system before having identified said system lag;

searching a second repository for said last command; and in response to having not found said last command in said second repository, adding said last command to said second repository, adding a length of zero to said second repository, associating said length of zero to said last command, and using said length of zero as said estimated length.

13. The computer program product of claim 8, said storing further comprising:

identifying a last command received by said computer system before having identified said system lag;

searching a second repository for said last command; and in response to having found said last command in said second repository, storing said actual length of said system lag in said second repository, deleting from said second repository a length corresponding to said last command, and associating in said second repository said actual length with said last command.

14. The computer program product of claim 8, said storing further comprising:

identifying a last command received by said computer system before having identified said system lag;

searching a second repository for said last command; and in response to having found said last command in said second repository, storing a value in said second repository equal to an average between said actual length of said system lag and a length located in said second repository corresponding to said last command, and associating in said second repository said value with said last command.

15. A computing system comprising a processor coupled to a computer-readable memory unit, said memory unit comprising a software application, said software application comprising instructions that when executed by said processor, implement a method for utilizing system lag to send facts to an end user, said method comprising:
- monitoring a computer system to identify said system lag;
- in response to having identified said system lag, determining an estimated length of said system lag, said estimated length being a measurement of time;
- sending a fact to said end user during said system lag, said fact having a length equal to or less than said estimated length; and
- storing the actual length of said system lag in order to improve subsequent determinations of said estimated length.

16. The computing system of claim 15, where prior to said monitoring:
- receiving from said end user an identification of at least one subject which said end user wishes to learn about, said receiving being in response to prompting said end user for said at least one subject;
- retrieving facts for each subject of said at least one subject, each fact of said facts having a length, said length being a measurement of time; and
- storing said facts for each subject of said at least one subject in a first repository.

17. The computing system of claim 15, where prior to said monitoring:
- receiving from said end user an identification of at least one subject which said end user wishes to learn about, said at least one subject being a subset of a list of subjects, said receiving being in response to providing said end user with said list of subjects;
- retrieving facts for each subject of said at least one subject, each fact of said facts having a length, said length being a measurement of time; and
- storing said facts for each subject of said at least one subject in a first repository.

18. The computing system of claim 15, said determining further comprising:
- identifying a last command received by said computer system before having identified said system lag;
- searching a second repository for said last command; and
- in response to having found said last command in said second repository, using a length in said second repository corresponding to said last command as said estimated length.

19. The computing system of claim 15, said determining further comprising:
- identifying a last command received by said computer system before having identified said system lag;
- searching a second repository for said last command; and
- in response to having not found said last command in said second repository, adding said last command to said second repository, adding a length of zero to said second repository, associating said length of zero to said last command, and using said length of zero as said estimated length.

20. The computing system of claim 15, said storing further comprising:
- identifying a last command received by said computer system before having identified said system lag;
- searching a second repository for said last command; and
- in response to having found said last command in said second repository, storing said actual length of said system lag in said second repository, deleting from said second repository a length corresponding to said last command, and associating in said second repository said actual length with said last command.

21. The computing system of claim 15, said storing further comprising:
- identifying a last command received by said computer system before having identified said system lag;
- searching a second repository for said last command; and
- in response to having found said last command in said second repository, storing a value in said second repository equal to an average between said actual length of said system lag and a length located in said second repository corresponding to said last command, and associating in said second repository said value with said last command.

22. A process for supporting computer infrastructure, said process comprising providing at least one support service for at least one of creating, integrating, hosting, maintaining, and deploying computer-readable code in a computing system, wherein said code in combination with the computing system is capable of implementing a method for utilizing system lag to send facts to an end user, said method comprising:
- monitoring a computer system to identify said system lag;
- in response to having identified said system lag, determining an estimated length of said system lag, said estimated length being a measurement of time;
- sending a fact to said end user during said system lag, said fact having a length equal to or less than said estimated length; and
- storing the actual length of said system lag in order to improve subsequent determinations of said estimated length.

23. The process for supporting computer infrastructure of claim 22, where prior to said monitoring:
- receiving from said end user an identification of at least one subject which said end user wishes to learn about, said receiving being in response to prompting said end user for said at least one subject;
- retrieving facts for each subject of said at least one subject, each fact of said facts having a different length, said length being a measurement of time; and
- storing said facts for each subject of said at least one subject in a first repository.

24. The process for supporting computer infrastructure of claim 22, where prior to said monitoring:
- receiving from said end user an identification of at least one subject which said end user wishes to learn about, said at least one subject being a subset of a list of subjects, said receiving being in response to providing said end user with said list of subjects;
- retrieving facts for each subject of said at least one subject, each fact of said facts having a length, said length being a measurement of time; and
- storing said facts for each subject of said at least one subject in a first repository.

25. The process for supporting computer infrastructure of claim 22, said determining further comprising:

identifying a last command received by said computer system before having identified said system lag;

searching a second repository for said last command; and in response to having found said last command in said second repository, using a length in said second repository corresponding to said last command as said estimated length.

* * * * *